(12) United States Patent
Jones et al.

(10) Patent No.: US 6,223,345 B1
(45) Date of Patent: Apr. 24, 2001

(54) SYSTEM AND METHOD FOR BUILDING CLIENT AND SERVER APPLICATION PACKAGES

(75) Inventors: Robert William Jones, Denver; Janet Knight, Parker; James Bruce Marshall, Denver; Martha Priser, Sedalia, all of CO (US)

(73) Assignee: J.D. Edwards World Source Company, Denver, CO (US)

( * ) Notice: Subject to any disclaimer, the term of this patent is extended or adjusted under 35 U.S.C. 154(b) by 0 days.

(21) Appl. No.: 09/385,483

(22) Filed: Aug. 30, 1999

(51) Int. Cl.[7] .............................. G06F 13/00; G06F 9/445; G06F 15/177
(52) U.S. Cl. ........................... 717/11; 709/220; 709/221; 713/1; 713/100
(58) Field of Search ..................................... 709/203, 220, 709/221, 222; 713/1, 100, 2; 717/11

(56) References Cited

U.S. PATENT DOCUMENTS

| | | | |
|---|---|---|---|
| 5,367,686 | * | 11/1994 | Fisher et al. .......................... 395/712 |
| 5,684,996 | * | 11/1997 | Westerholm et al. ................. 395/712 |
| 5,721,824 | * | 2/1998 | Taylor .................................. 709/203 |
| 5,835,911 | * | 11/1998 | Nakagawa et al. .................. 707/203 |
| 5,845,090 | * | 12/1998 | Collins, III et al. ................. 709/221 |
| 5,845,128 | * | 12/1998 | Noble et al. .......................... 395/712 |
| 5,857,107 | * | 1/1999 | Tsuchida .............................. 395/712 |
| 5,860,012 | * | 1/1999 | Luu ...................................... 395/712 |
| 5,919,247 | * | 7/1999 | Hoff et al. ............................ 709/217 |
| 5,930,513 | * | 7/1999 | Taylor .................................. 395/712 |
| 5,931,909 | * | 8/1999 | Taylor .................................. 709/221 |
| 5,950,010 | * | 9/1999 | Hesse et al. ......................... 395/712 |
| 5,960,204 | * | 9/1999 | Yinger et al. ........................ 395/712 |
| 6,006,034 | * | 12/1999 | Health et al. ........................ 395/712 |
| 6,047,129 | * | 4/2000 | Frye ...................................... 395/712 |

* cited by examiner

*Primary Examiner*—Dung C. Dinh
*Assistant Examiner*—Nkosi Trim
(74) *Attorney, Agent, or Firm*—Sheridan Ross, P.C.

(57) ABSTRACT

The application package building system includes an application storage maintaining specification and component information, and a client package build system which creates an application package definition for both a client application package and a server application package. The package definition identifies required specification and component information for both the client application package and the server application package. A client package build engine builds the client application package using the required specification and component information, and a server package build engine builds the server application package from the required specification and component information.

20 Claims, 5 Drawing Sheets

SYSTEM AND METHOD FOR BUILDING CLIENT AND SERVER APPLICATION PACKAGES

BACKGROUND OF THE INVENTION

1. Technical Field

This invention relates in general to building application packages in a distributed client/server computing environment. The invention more particularly relates to building a client application package and a corresponding server application package.

2. Background Art

Modem data processing systems are often implemented as distributed computing environments. A typical distributed computing environment configuration includes one or more "client" computers, including personal computers and workstations, that communicate with one or more "server" computers. In this "client/server" environment, the client computers request data, files or other information from the server computer, and the server computer serves the client computer with the requested information. In some distributed computing environments, a computer may operate as a client computer and as a server computer.

A custom application package building system for use in a client/server distributed computing environment was described in co-owned and co-pending U.S. patent application Ser. No. 08/756067, entitled "SYSTEM AND METHOD FOR CUSTOMIZED APPLICATION PACKAGE BUILDING AND INSTALLATION" and filed Nov. 25, 1996 (the "Custom Package Building application"), which patent application is incorporated by reference as if fully set forth herein. The application package building system described therein enabled a user to define and build a custom application package for either a client computer or for a server computer.

The application package building system enabled a client application package for use on a client computer to be defined and built. A server application package, corresponding to the client application package, had to be defined and built in a separate operation. Separate client and server application packages were required to accommodate the various hardware/software platforms associated with the client computers and the server computers.

Business function information defining business logic used by the application packages, as well as the specification information defining the application components of the application packages, were dependent upon the particular hardware/software platforms that would receive the application packages. In addition, each hardware/software platform had a particular system for maintaining and utilizing data. Thus, a separate application package had to be defined for the client computers and for the server computers, wherein the application packages accommodated the particular hardware/software platform of the associated client and server computers.

Although the application package building system enabled the building of client and server application packages, the amount of time required to complete the building of both the client and server application packages was relatively long. In this regard, the client and server application packages were defined separately as each application package had its own unique requirements. Consequently, the selection of applications, modules and other components made while defining the client application package required repeating when subsequently defining the server application package. Furthermore, the application package building system was not able to build a fill server application package.

Building the server application package for more than one server computer added additional time to complete the process. The additional time was due to the need to separately define and build a server application package for each server computer that required the server application package.

Therefore, it would be highly desirable to have a new and improved application package building system that can build a client application package, and a corresponding server application package, in a relatively quick, effortless and efficient manner.

The prior application package building system also extended the time required to build update packages for the client application package and the server application package. Each update package, including both the client and server application packages, represented a snap shot in time of specific modifications made to the application packages. As time progressed, and additional changes were required for the client and server application packages, additional update packages for each modification were required.

Although the update packages enabled the originally built client and server application packages to be modified to accommodate subsequent revisions, such update packages were not efficient for re-building the application packages or for building the application packages on newly added client or server computers. The inefficiency resulted from the need to reinstall the original client or server application package, and then install each and every subsequent update package associated with the original application package. Furthermore, when an installation process failed to complete the installation of the client or server application packages, the installation process had to be restarted from the beginning.

Therefore, it would also be highly desirable to have a new and improved system and method for building client and server application packages which enables the client and server application packages to be updated so that the application packages maintained on the client and server computers are substantially current. Such a system and method should enable the installation of only the remaining portions of the client and server application packages which were not installed after the installation process was interrupted.

SUMMARY OF THE INVENTION

Therefore, the principal object of the present invention is to provide a new and improved application package building system and a method of using it, wherein the application package building system builds client and server application packages quickly and efficiently. Such an application package building system should build update packages to keep client and server application packages current, and should reduce installation time even when installation irregularities occur.

Briefly, the above and further objects of the present invention are realized by providing a new and improved application package building system which builds client and server application packages, and also build update packages for the client and server application packages according to a novel method of the present invention.

The application package building system includes an application storage maintaining specification and component information, and a client package build system which creates an application package definition for both a client application package and a server application package. The package definition identifies required specification and component information for both the client application package and the server application package. A client package build engine builds the client application package using the required specification and component information, and a server package build engine builds the server application package from the required specification and component information.

BEST MODE FOR CARRYING OUT THE INVENTION

Figure 1:
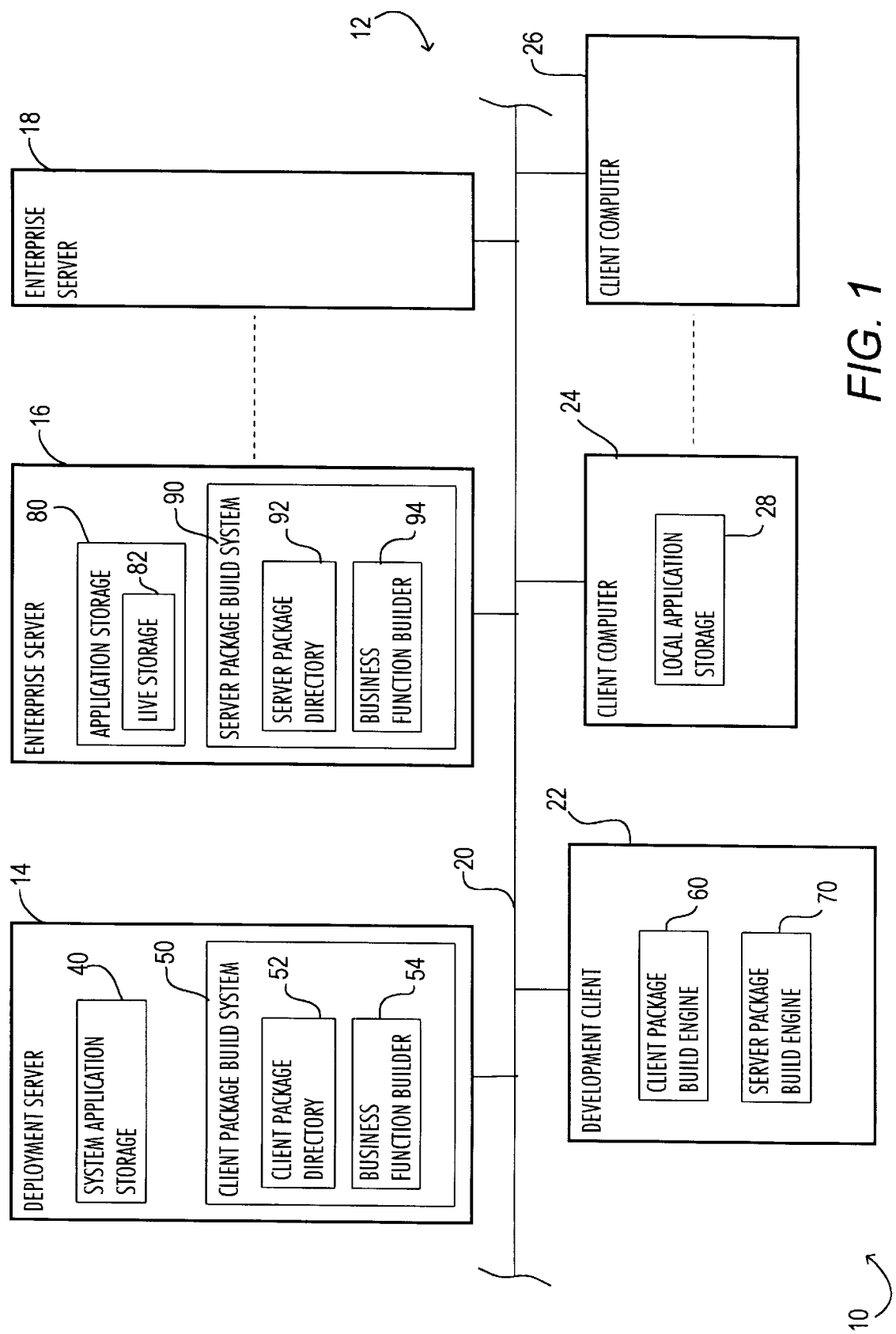
FIG. 1 is a block diagram illustrating an application package building system that is constructed in accordance with the present invention.

Referring now to the drawings, and more particularly to FIG. 1 thereof, there is shown an application package building system 10 for building a client application package and a corresponding server application package, and which is constructed in accordance with the present invention. The client and server application packages that are built with the package building system 10 enable distributed processing on a client/server distributed computing system 12 including a deployment server computer 14 and one or more enterprise server computers, such as enterprise server computers 16 and 18. The computing system 12 further includes a development client computer 22 and one or more client computers or workstations, such as client computers 24 and 26, connected to the server computers 14, 16 and 18 by a network 20. By installing the client application package on, one or more of the client computers 24 and 26, and installing the server application package on one or more of the enterprise server computers 16 and 18, the server computers 16 and 18 are able to process requests for processing services received from the client computers 24 and 26.

In the preferred embodiment, the client application package and the server application package are based on application suites as described in the Custom Package Building application. The application suites relate to computer application programs that perform enterprise functions such as payroll, inventory, accounts payable, and budgeting. The application suites are further defined by individual applications or application modules that include data or information that is usually specific to the particular application suite to which the application module is associated. For example, the payroll suite may include a time entry application module and an address application module, as well as a compensation application module, all of which are required to process a payroll in an enterprise.

The client and server application packages substantially correspond to one another, and generally include similar objects. Each application package comprises one or more application modules or programs from the one or more application suites. The application packages may include only particular application modules from one or more application suites, but not an entire application suite, or may include one or more entire application suites plus particular application modules from other application suites. Further, each application module is comprised of a logical group of forms that are associated with specific application functions or elements, such as data entry or file browsing.

To facilitate the building of the client and server application packages, the package building system 10 includes a system application storage 40 and a client package build system 50 located on the deployment server computer 14. The system application storage 40 maintains application specification information that defines the application modules, forms and other objects comprising, the application packages. The application specification information is stored in the system application storage 40 as specification files.

In the preferred embodiment, each specification file is a table access management ("TAM") file structure. The TAM file structure is a tree hierarchy format that includes a record type identification field, a record control field, and data text. The TAM file is organized to provide the record type, for example a form or a report, or the record control, for example push button operations or drop down box operation, followed by text string(s) associated with the record type or record control that preceded the text.

The system application storage 40 also maintains component information including source aid header information which define business functions utilized by the application modules. A business function is a program that can be used and accessed by multiple applications, and includes special logic for conducting operations such as retrieving data from other files, undertaking table manipulation including updates and deletions, calculations or other data manipulation, and data retrieval. The component information also includes business logic components created by compiling the source and header information, where the business logic components are executed to perform the associated business functions.

The client package build system 50 cooperates with the development client computer 22 to define the client and server application packages. The resulting package definition identifies the application modules associated with the application packages, as well as the specification information and component information required by the application modules.

The package building system 10 further includes a client package build engine 60 and a server package build engine 70 located on the development server computer 22. The client package build engine 60 is responsive to the package definition for building the client application package according to the required specification information and required component information. Using the same required specification information and required component information, the server package build engine 70 then builds the corresponding server application package.

Although in the preferred embodiment the system application storage 40 and the client package build system 50 are located on the deployment server computer 14, and the client package build engine 60 and the server package build engine 70 are located on the development client computer 22, one skilled in the art will understand that other configurations are possible within the client/server distributed computing environment 12.

A server package build system 90 located on enterprise server computer 16 maintains the server application package built by the server package build engine 70. An application storage 80 located on the enterprise server computer 16 maintains application information for the application module or modules comprising the server application package to enable the server computer 16 to process requests from the client computers 24 and 26. The application storage 80 includes a live storage 82 for maintaining the required specification information and the required component information deployed from the server package build system 90. The enterprise server computer 18 is substantially similar to the server computer 16, and can also maintain the server application package to process requests from the client computers 24 and 26.

A local application storage 28 located on the client computer 24 maintains application information for the application module or modules associated with the client application package to enable the client computer 24 to execute the application module or modules. The client computer 26 is substantially similar to the client computer 24, and can also maintain the application information to enable the client computer 26 to execute the application module or modules.

A history table (not shown) maintains installation history information for the installation of the client application package and the server application package. In the event that the client application package or the server application package installation is interrupted due to an irregularity in the installation process, the installation history information identifies the progress of the installation of the client and server application packages to enable the installation of the application packages to proceed from the point where the interruption occurred. In this way, only the remaining portions of the application packages that were not installed initially can be subsequently installed, thereby eliminating the need to restart the installation process from the beginning.

In operation, the system application storage 40 maintains application specification information and component information for all the available objects of the application suites. Using the development client computer 22 in cooperation with the client package build system 50, an application package definition is created, wherein the package definition is indicative of a client application package and of a corresponding server application package. The package definition identifies the application specification information and the component information that is required by both the client application package as well as by the server application package.

The package definition is submitted to the client package build engine 60 which builds the client application package from the required application specification information and the required component information. The package definition is subsequently submitted to the server package build engine 70 which then builds the server application package.

Figure 2:
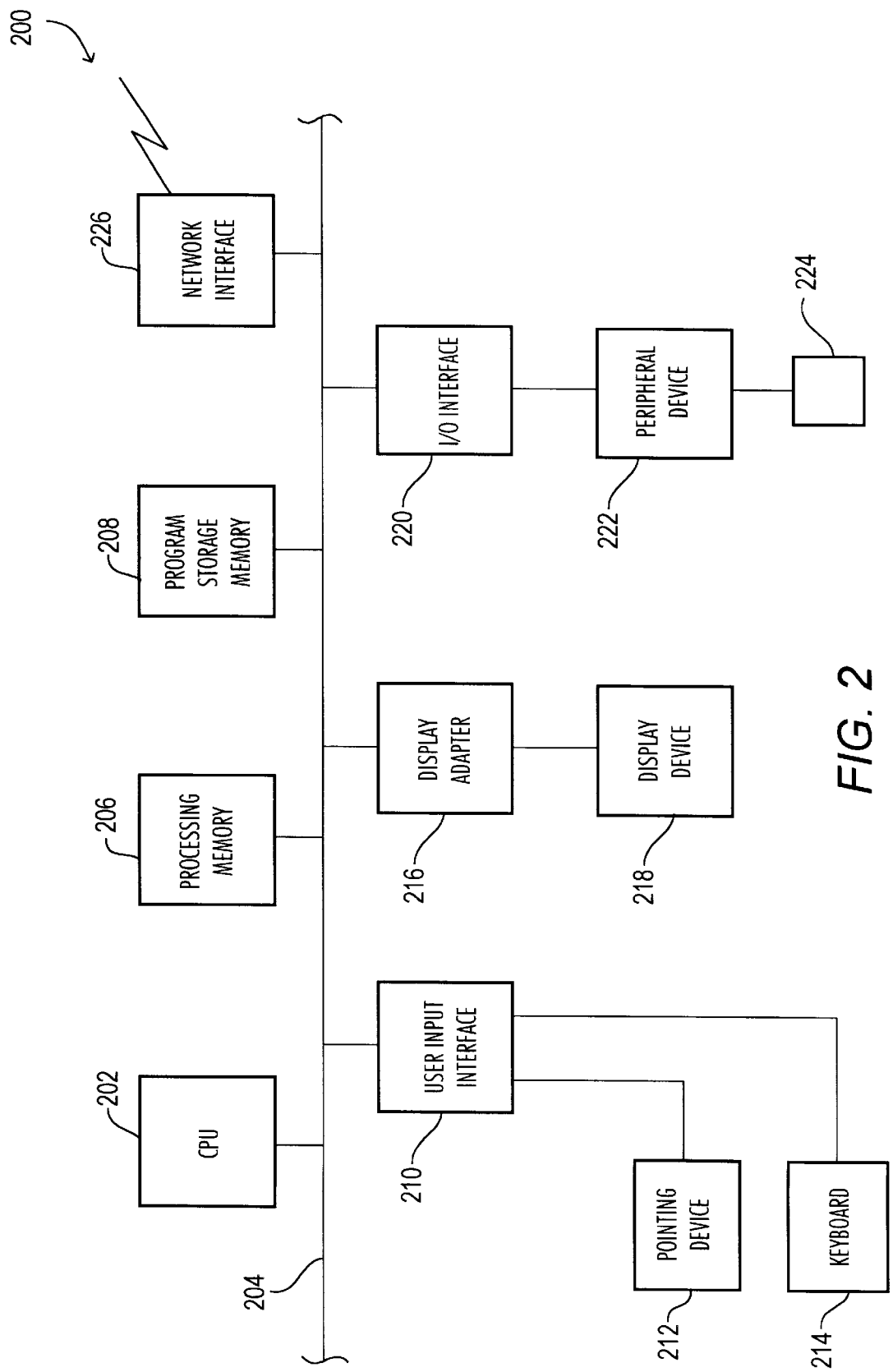
FIG. 2 is a block diagram illustrating a general purpose computing system for use with the application package building system of FIG. 1.

In the preferred embodiment, the deployment server computer 14, the enterprise server computers 16 and 18, the development client computer 22 and the client computers 24 and 26 are implemented in a general purpose computing or information processing system such as processing system 200 (FIG. 2). The processing system 200 includes a central processing unit ("CPU") 202 connected by a bus 204 to a processing storage or memory device 206 and a program/data storage or memory device 208.

The server computers 14, 16 and 18 may be conventional personal computers, workstation machines, mid-range computer platforms or large system computer platforms, and use conventional software operating environments depending on the available hardware platform. For example, the OS/400 operating system from IBM Corporation of Armonk, N.Y. may be used with an AS/400 mid- range computer also from IBM Corporation, the HP-UX operating system from Hewlett-Packard Corporation of Palo Alto, Calif. may be used with an HP-9000 mid-range computer also from Hewlett-Packard Corporation, or the WINDOWS NT SERVER operating system from Microsoft Corporation of Redmond, Wash. The server computers 14, 16 and 18 may also operate on other conventional software operating environments such as WINDOWS 98 (Microsoft Corporation), UNIX (X/Open Company Ltd.), or SOLARIS (Sun Microsystems, Inc. of Palo Alto, Calif.) operating environments.

The client computers 22, 24 and 26 are conventional personal computers or workstation machines having conventional hardware components. The CPU 202 for the client computers 22, 24 and 26 may be a conventional, commercially available, processor such as a PENTIUM processor from Intel Corporation of Santa Clara, Calif., or a SPARC processor from Sun Microsystems, Inc. cf Mountain View, Calif. The client computers 22, 24 and 26 use conventional, commercially available, software operating environments such as WINDOWS 95, WINDOWS 98 or WINDOWS NT from Microsoft Corporation of Redmond, Wash., or a UNIX (X/Open Company Ltd.) based operating system. In various embodiments, the client computers 22, 24 and 26 may be of the same or different hardware and software platform types.

The processing system 200 further includes a user input interface 210 connected to the bus 204 for enabling user input via a pointing device 212, such as a mouse, and also with a keyboard device 214. To provide a visual display, the processing system 200 also includes a display device 218 connected to the bus 204 through a display adapter 216.

An input/output ("I/O") interface 220 is connected to the bus 204 to permit a peripheral device 222 to interface with the processing system 200. The peripheral device 222 includes a disk drive for reading and/or writing electronic information to computer-usable storage medium such as a magnetic disk 224. Other peripheral devices, including tape drives and compact disk drives, can also be incorporated into the processing system 200.

A network interface 226 is also connected to the bus 204 to enable the processing system 200 to access the network 20 (FIG. 1). The network 20 is a conventional logical network such as a local area network ("LAN") a wide area network ("WAN"), and is implemented using commercially available network hardware and software.

Considering now the application package building system 10 in greater detail with reference to FIG. 1, the client package build system 50 cooperates with the client package build engine 60 to identify the application specification information and component information required by the client and server application packages. The client package build system 50 then organizes the required information according to a client package directory 52.

After the client package build engine 60 completes the building of the client application package, the server package build engine 70 transfers a copy of the required information to the server package build system 90. The server package build system 90, in cooperation with the server package build engine 70, organizes the transferred information according to a server package directory tree 92.

Figure 3:
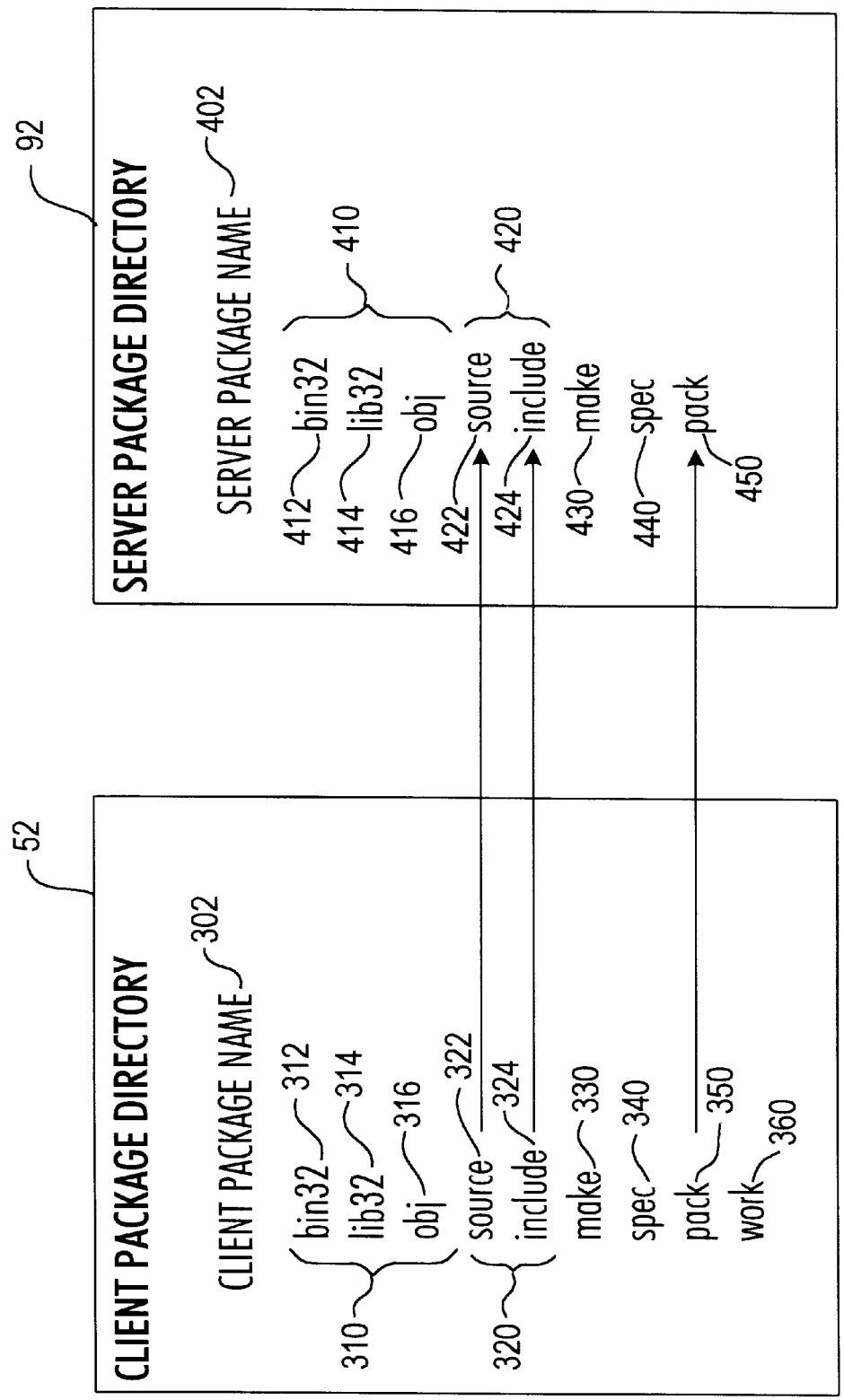
FIG. 3 is a bock diagram illustrating a client package directory and a server package directory of the application package building system of FIG. 1.

As best seen in FIG. 3, the client package directory 52 includes a client package name directory 302, as well as a bin32 subdirectory 312, a lib32 subdirectory 314, an obj subdirectory 316, a source subdirectory 322, an include subdirectory 324, a make subdirectory 330, a spec subdirecitory 340, a pack subdirectory 350 and a work subdirectory 360. The bin32 subdirectory 312, the lib32 subdirectory 314 and the obj subdirectory 316 comprise business logic component information 310. The source subdirectory 322 and the include subdirectory 324 comprise the component information 320.

The source subdirectory 322 and the include subdirectory 324 are initially populated with the required component information and the spec subdirectory 340 is initially populated with the required application specification information as determined by the application package definition.

In order to distribute the required application specification information, which is maintained in the TAM file format, to the enterprise server computer 24, the client package build system 50 (FIG. 1) builds pack file information concurrently with the building of the required application specification information and required component information. The pack file information corresponds to the required application specification information and is maintained in the pack subdirectory 350 (FIG. 3). The pack file information can then be transferred across the network 20, and unpacked onto the enterprise server computer 24 by the server package build engine 70.

The client package build system 50 (FIG. 1) includes a business function builder 54 for compiling the component information 320 (FIG. 3) maintained in the source subdirectory 322 and the include subdirectory 324 to populate the bin32 subdirectory 312, the lib32 subdirectory 314 and the obj subdirectory 316.

The server package directory 92 (FIG. 3) includes a server package name directory 402, as well as a bin32 subdirectory 412, a lib32 subdirectory 414, an obj subdirectory 416, a source subdirectory 422, an include subdirectory 424, a make subdirectory 430, a spec subdirectory 440, and a pack subdirectory 450. The source subdirectory 422 and the include subdirectory 424 comprise the component information 420.

The source subdirectory 422 and the include subdirectory 424 are initially populated by the transfer of information from the client package directory 52 by the server package build engine 70, wherein the required component information maintained in the source subdirectory 322 and the include subdirectory 324 is copied to the corresponding directories 422 and 424. In addition, the pack subdirectory 450 is populated when the required application specification information maintained in the pack subdirectory 350 is copied to the pack subdirectory 450. The server package build system 90 (FIG. 1) then unpacks the pack file information maintained in the pack subdirectory 450 and populates the spec subdirectory 440 with the unpacked pack file information.

The server package build system 90 includes a business function builder 94 for compiling the component information 420 into business logic component information 410, wherein the bin32 subdirectory 412, the lib32 subdirectory 414 and the obj subdirectory 416 are populated with the required component information.

Figure 4:
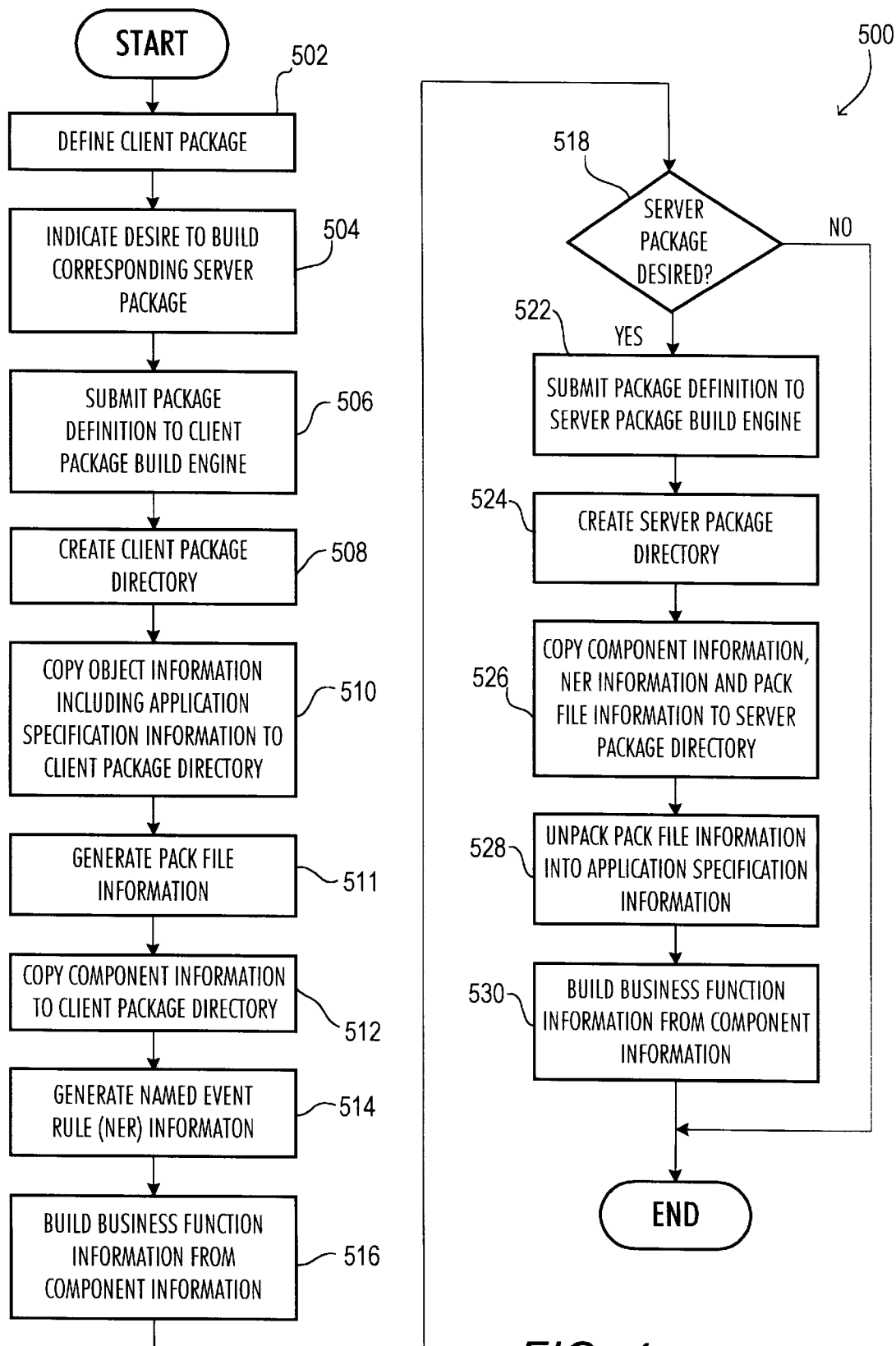
FIG. 4 is a flow chart illustrating a process for building a client application package and a server application package in accordance with the present invention.

Considering now the method of building a client application package concurrently with a server application package, a client and server application package building operation 500 is shown in FIG. 4. Initially, a client application package is defined at box 502 to create an application package definition. The defining of a client application package includes selecting desired objects for the client application package, including application modules, forms, business views and functionality. An exemplary process for defining the client application package is described in the Custom Package Building application.

In order to build a server application package corresponding to the client application package, and including substantially the same objects, a selection is made at box 504 to indicate that the building of the server package application is desired. Also at box 504, the selection of one or more enterprise server computers, such as the enterprise server computers 16 and 18, which are to receive the server application package is made. A list of the available server computers and associated server information, including the operating system utilized by each server computer, can be maintained in the system application storage 40 (FIG. 1).

The application package definition is then submitted to the client package build engine 60 (FIG. 1) at box 506. The engine 60 creates the client package directory at box 508, and creates client TAM file information by copying object information for the application package definition from a production or check-in environment to the client package directory. The object information includes application specification information that is copied to a specification subdirectory of the client package directory. When an indication is made at box 504 that a server application package is to be created, the engine 60 generates pack file information corresponding to the application specification information at box 511, wherein the pack file information is maintained in the pack subdirectory of the client package directory.

The engine 60 also copies component information, including source and header information for defining business functions, from the production environment to the client package directory at box 512.

Named Event Rule ("NER") information is generated at box 514, where the NER information is determined by the application package specification. Business logic or function component information is built at box 516 from the component information copied at box 512, and maintained in the business function information subdirectories of the client application package.

A determination is made at decision box 518 regarding the building of a server application package corresponding to the client application package. If no indication was made at box 504 to build the server application package, the process 500 is terminated. Where the building of the server application package was indicated positively at box 504, the application package definition is then submitted to a server package build engine, such as the engine 70 (FIG. 1), at box 522. The engine 70 creates a server package directory at box 524, and copies the component information, NER information and pack file information from the client package directory to the corresponding subdirectories of the server package directory at box 526.

The copied pack file information identified in the pack subdirectory of the server package directory is unpacked at box 528 back into application specification information to create server TAM file information, which is identified in the spec subdirectory of the server package directory. Business function information is then built from the component information and NER information at box 530, and the resulting business logic component information is identified in the bin32 subdirectory, lib32 subdirectory and obj subdirectory of the server package directory. The process then terminates upon the completion of the business function information building operation.

Considering now the client application package and the server application package in more detail, the client and server application packages may comprise a full application package, a partial package or an update package. A fill application package includes enough information to support an entire application suite.

A partial application package includes only enough information to support a foundation portion of the application suite on a client computer, such as the client computer 24 (FIG. 1), and includes a menu identifying available application modules or components. In response to a selection of an application module or component from the menu, and the application information required to support the selected module or component is not maintained on the client workstation 24, the application information for the selected application module or component can be transferred to the requesting workstation 24 on a just-in-time basis. An exemplary system for transferring the application information for the application module or component on a just-in-time basis is described in co-pending, and co-owned patent application Ser. No. 08/740360, entitled "SYSTEM AND METHOD FOR INSTALLING APPLICATIONS ON A COMPUTER ON AN AS NEEDED BASIS", and filed Oct. 28, 1996, which patent application is incorporated by reference as if fully set forth herein.

An update application package includes only updated information for the application modules or objects of an application suite. By updating only the application information affected by modifications, an installed client or server application package can be updated quickly. In the preferred embodiment of the present invention, an update application package is incorporated into an existing parent client or server application package. Thus, the client and server application package; residing on the client and server computers are always current.

Figure 5:
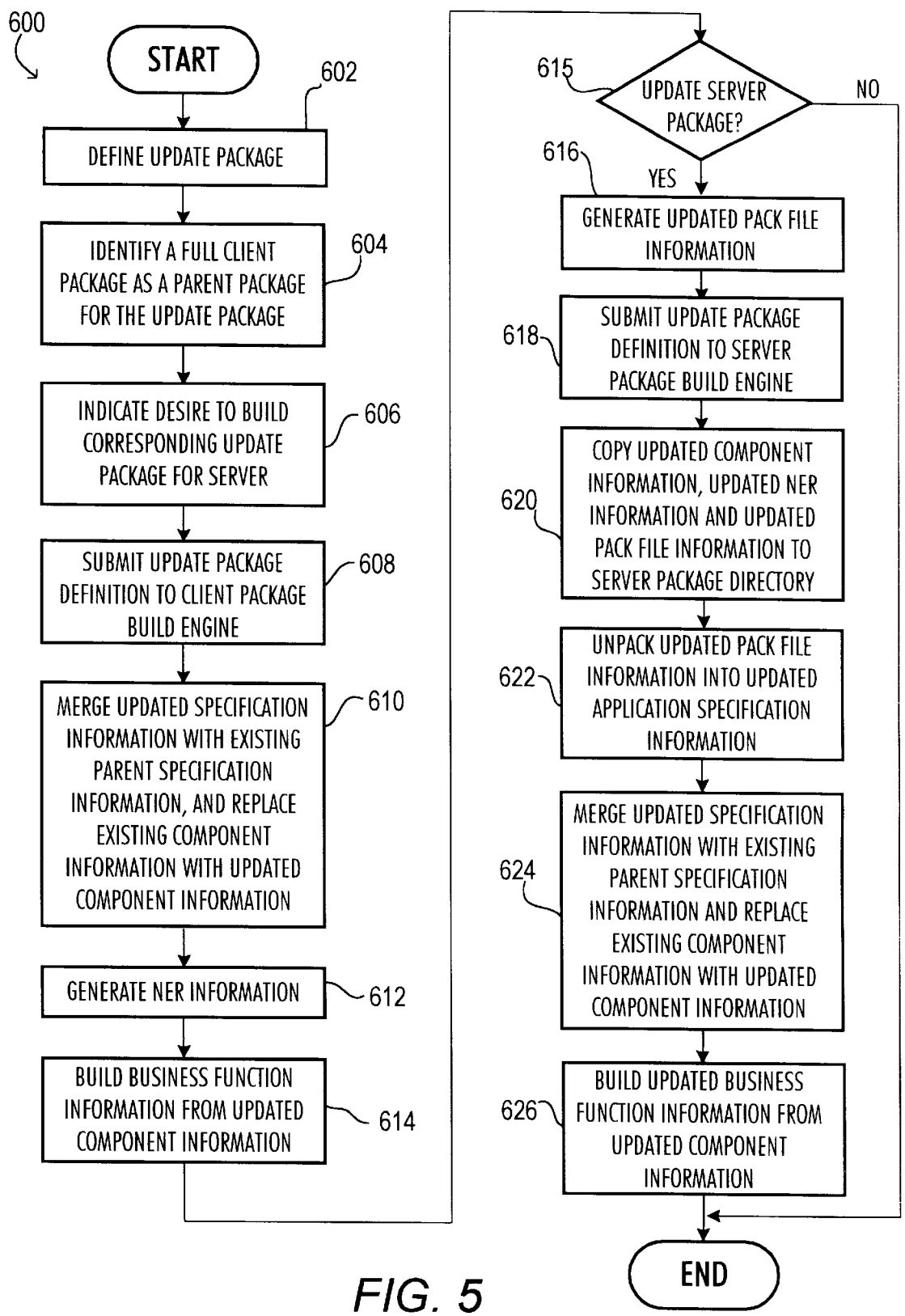
FIG. 5 is a flow chart illustrating a process for updating a client application package and a server application package in accordance with the present invention.

Considering now the building of update packages for client and server packages with reference to FIG. 5, there is shown an update package build operation 600. Initially, the update package is defined at box 602 by selecting the desired updated components or objects for the update package. Subsequently, an existing full client application package is identified at box 604 as a parent package that will be updated by the update package. The update package definition created at box 602 can be used to build a corresponding server update package. An indication to build the server update package is made at box 606.

The update package definition is submitted to the client package build engine 60 (FIG. 1) at box 608. The updated application specification information for the update package is then merged with the corresponding existing parent application specification information, and the existing component information is replaced with the corresponding updated component information for the update package, at box 610.

Updated NER information is generated at box 612, and business function information is built from the updated component information at box 614. A determination is made at decision box 615 regarding whether or not an update package is desired for the server application package as indicated at box 606. If no server update package is desired, the operation terminates.

Where a server update package is indicated positively at box 606, pack information for the updated application specification information is generated at box 616 and the update package definition is submitted to the server package build engine 70 (FIG. 1) at box 620. The updated component information, NER information and pack file information of the update package maintained in the client package directory are copied to the server package directory at box 622, and the updated pack file information is unpacked into updated application specification information at box 624.

The updated specification information is merged with the existing parent application specification information, and the existing component information is replaced by the updated component information at box 626. Updated business function information is built from the updated component information at box 628, wherein the existing client and server application packages are now updated and the operation terminates.

While particular embodiments of the present invention were disclosed, it is to be understood that various different modifications are possible and are contemplated within the true spirit and scope of the appended claims. There is no intention, therefore, of limitations to the exact abstract or disclosure presented herein.

What is claimed is:

1. An application package building system for a client and a server, comprising:

an application storage for maintaining application specification information and component information;

a client package build system for creating an application package definition indicative of both a client application package adapted for installation on the client and a corresponding server application package adapted for installation on the server for enabling the server to process requests from the client, said definition identifying said application specification information and said component information required by said client application package and said server application package;

a client package build engine responsive to said definition for building said client application package from said required application specification information and said required component information; and a server package build engine responsive to said definition for building said server application package from said required application specification information and said required component information.

2. A system according to claim 1, wherein said definition identifies server information for the server receiving said server application package.

3. A system according to claim 2, wherein said client package build engine creates pack file information corresponding to said required application specification information.

4. A system according to claim 3, wherein said server package build engine copies said pack file information to said server and recreates said required application specification information from said pack file information according to said server information.

5. A system according to claim 1, wherein said client package build system includes a business function builder for building business logic components for said client application package from said required component information, and creates client package directory information for said client application package identifying said required application specification information, said required component information and said business logic components.

6. A system according to claim 1, further including a server package build system for maintaining said server application package, said server package build system including a business function builder for building business logic components for said server application package from said required component information.

7. A system according to claim 6, wherein said server package build system maintains said server application package on a server, and further including a live storage on said server to maintain said required application information and said business logic components when said server application package is deployed to said server.

8. A system according to claim 1, wherein said definition is an update package definition for updating a parent client application package and a parent server application package.

9. A system according to claim 8, wherein said update package definition identifies updated required application specification information and updated required component information.

10. A system according to claim 9, wherein said required application specification information is merged with said updated required application specification information and said updated required component information replaces said required component information in said parent client application package and in said parent server application package.

11. A method for building application packages for a client and a server, comprising;

maintaining application specification information and component information;

creating an application package definition indicative of both a client application package adapted for installation on the client and a corresponding server application package adapted for installation on the server for enabling the server to process request from the client, said definition identifying said application specification information and said component information required by said client application package and said server application package;

building said client application package from said required application specification information and said required component information in accordance with said definition; and building said server application package from said required application specification information and said required component information in accordance with said definition.

12. A method according to claim 11, further including identifying server information for the server receiving said server application package.

13. A method according to claim 12, further including creating pack file information corresponding to said required application specification information.

14. A method according to claim 13, further including copying said pack file information to said server and recreating said required application specification information from said pack file information according to said server information.

15. A method according to claim 11, further including building business logic components for said client application package from said required component information, and creating client package directory information for said client application package to identify said required application specification information, said required component information and said business logic components.

16. A method according to claim 11, further including maintaining said server application package, and building business logic components for said server application package from said required component information.

17. A method according to claim 16, further including maintaining said server application package on a server, and deploying said required application information and said business logic components to a live storage on said server.

18. A method according to claim 11, further including indicating said definition is an update package definition for updating a parent client application package and a parent server application package.

19. A method according to claim 18, further including identifying updated required application specification information and updated required component information.

20. A method according to claim 19, further including merging said required application specification information with said updated required application specification information and replacing said required component information with said updated required component information in said parent client application package and in said parent server application package.

* * * * *